Dec. 1, 1931.  F. J. JOHNSON  1,834,541
CLOSURE DEVICE
Filed June 12, 1930
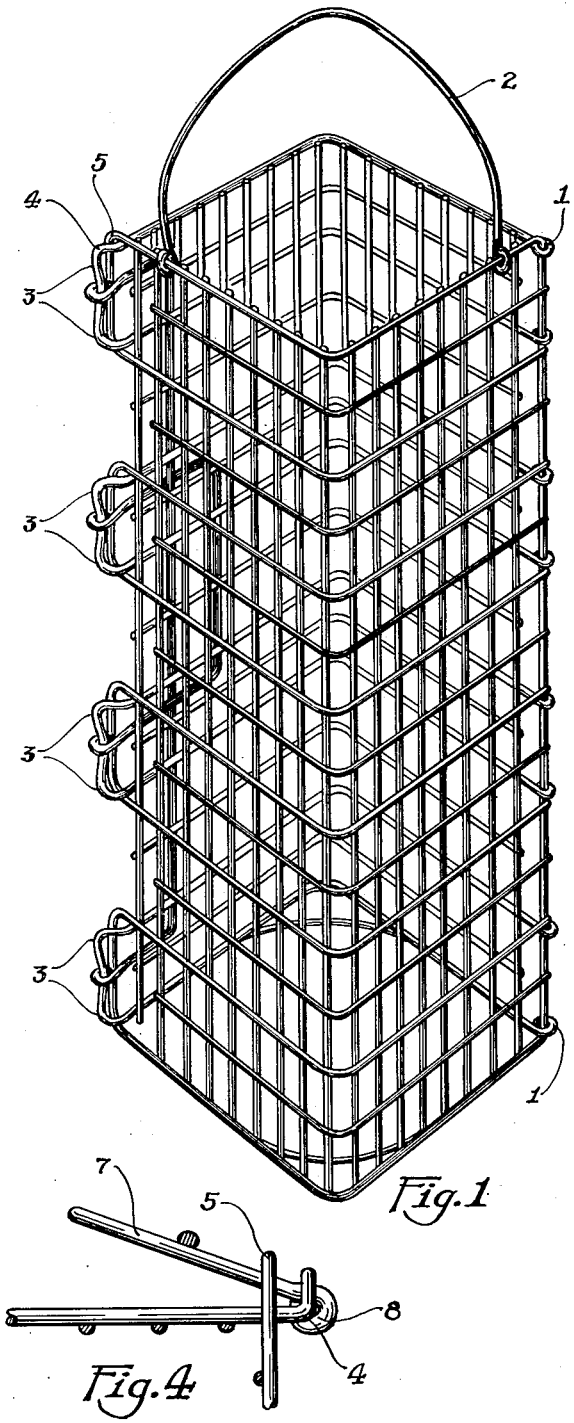
Fig. 1
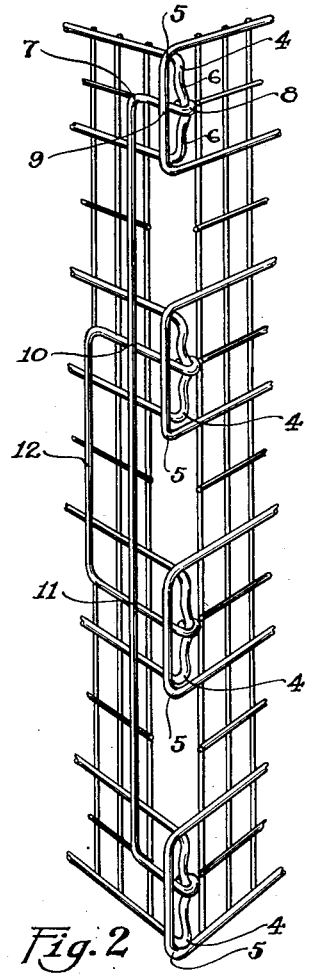
Fig. 2
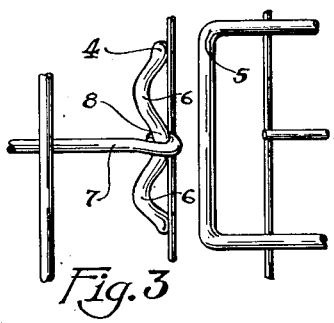
Fig. 3
Fig. 4
WITNESS
Wm. C. Meiser
Frank J. Johnson
INVENTOR
BY
ATTORNEY Patented Dec. 1, 1931

1,834,541

UNITED STATES PATENT OFFICE

FRANK J. JOHNSON, OF WHEELING, WEST VIRGINIA, ASSIGNOR, BY MESNE ASSIGNMENTS, TO INDUSTRIAL PATENTS CORPORATION, OF CHICAGO, ILLINOIS, A CORPORATION OF DELAWARE

CLOSURE DEVICE

Application filed June 12, 1930. Serial No. 460,729.

My invention relates to improvements in closure devices for sausage molds and the like. My invention relates only to the closure latch or opening and closing device, and not to the mold except in relation to the latch.

In the drawings, the latch is shown as it might be used with a wire sausage mold. Figure I is a perspective view of a wire sausage mold fitted with the latch, the latch being in closed position. Figure II is a perspective detail of the latch shown in closed position. Figure III is a detail of one latch unit in open position. Figure IV is a cross-sectional view through one unit of the latch. In the drawings, similar reference numbers indicate similar parts in all views.

Referring now to the drawings: My improved latch consists of a plurality of wires disposed longitudinally and in loops and angles, as shown in the drawings. The mold shown in Figure I is a type of wire sausage mold in commercial use, which consists of two co-acting members each member forming two sides of the mold, which two co-acting members are hingedly united as at 1, 2 being merely a handle for convenience in carrying the mold. The mold is furnished with latch units 3, consisting of co-acting catch members 4 and 5, catch member 4 being adapted to be inserted through catch member 5, the bight of catch member 4 being offset, forming keepers 6. Lever 7 is hingedly mounted on catch member 4 at 8, the arc at 8 being sufficient to accommodate lever 7 below member 5 when in closed position. In opening, lever 7 is moved so that the shank thereof contacts with member 5, point of contact being the fulcrum of the lever as at 9, action forcing member 4 into the open position.

My improved latch is especially designed as an opening device for molds or holders for molding and processing sausage and other meats. It may be utilized with a wire sausage mold or with a sausage mold having solid walls.

It has been found in practice that the ordinary sausage mold is difficult to open. My improved opening device permits a speedy safe opening of the mold without resort by the operator to pointed instruments or other tools to assist in opening of individual molds which may be especially difficult to open.

Figure I shows a wire sausage mold fitted with four units of the latch device. It will be noted in Figure II that the levers of the two outside units are formed from one piece of wire and the levers of the two inside units are formed from another single piece of wire, the two pieces of wire being welded at 10 and 11 so that the plurality of levers may be operated simultaneously by manually seizing 12. The added length of the two inside levers, of course, gives greater leverage.

It is understood that changes may be made in the details of my device without altering the spirit of the invention.

I claim:

1. In a holder of the class described, the combination of two side members each hinged at one side edge and adapted to open and close and provided at their free side edges at spaced points with cooperating interlocking loops arranged in pairs, the bight of one of the loops of each pair being laterally offset and engaging within the other cooperating loop to interlock the loops of each pair with each other for holding the side members closed, and a lever having a plurality of lever arms each fulcrumed on one of the loops of each pair and extending through the other loop thereof, said lever being adapted to be oscillated to simultaneously disengage a plurality of pairs of interlocking loops.

2. In a holder of the class described, the combination of two side members each hinged at one side edge and adapted to open and close, and outer and intermediate pairs of cooperative interlocking loops carried by the side members, a lever extending across the space between the outer pairs of loops and having lever arms fulcrumed on one of the loops of each outer pair and extending through the other loop of the outer pairs, and a second lever extending across the space between the intermediate pairs of loops and having the lever arms fulcrumed on one of the loops of each intermediate pair and extending through the other loop thereof, and operatively connected with the lever of the outer pairs of loops, whereby when the lever of the intermediate loops is oscillated, the loops of the outer and intermediate pairs will be disengaged to unlock the side members.

Signed at Wheeling, West Virginia, this 5th day of June, A. D. 1930.

FRANK J. JOHNSON.